United States Patent [19]

Iversen

[11] Patent Number: 4,696,481

[45] Date of Patent: * Sep. 29, 1987

[54] LIQUID COOLED FERROFLUID-TYPE ROTATING SEALS

[76] Inventor: Arthur H. Iversen, 15315 Sobey Rd., Saratoga, Calif. 95070

[*] Notice: The portion of the term of this patent subsequent to Jun. 3, 2003 has been disclaimed.

[21] Appl. No.: 846,612

[22] Filed: Apr. 1, 1986

Related U.S. Application Data

[63] Continuation of Ser. No. 699,428, Feb. 7, 1985, Pat. No. 4,592,557.

[51] Int. Cl.$^4$ .................. F16J 15/40; F16J 15/44; F16J 15/54
[52] U.S. Cl. ..................................... 277/80; 277/135
[58] Field of Search ............... 277/80, 135, 1, 22, 277/53

[56] References Cited

U.S. PATENT DOCUMENTS

| | | | |
|---|---|---|---|
| 2,587,077 | 2/1952 | Winther | 277/80 X |
| 3,700,248 | 10/1972 | Teske et al. | 277/80 |
| 3,746,407 | 7/1973 | Stiles et al. | 277/80 X |
| 4,054,293 | 10/1977 | Hoeg et al. | 277/80 X |
| 4,440,402 | 4/1984 | Pinkus et al. | 277/80 |
| 4,514,987 | 5/1985 | Pundak et al. | 277/80 X |

Primary Examiner—Robert S. Ward
Attorney, Agent, or Firm—Foley & Lardner

[57] ABSTRACT

A ferrofluid rotary-shaft seal apparatus of extended seal life suitable for use as an exclusion seal in vacuum or other demanding applications which seal apparatus comprises:

(a) an annular permanent magnet adapted to surround the rotary shaft to be sealed and having poles of opposite polarity at each end; and (b) a series of spaced magnetically permeable, pole-piece elements in a magnetic-flux relationship with the one and other ends, respectively, of the permanent magnet, each pole piece having a one end and another end and adapted to surround the rotary shaft to be sealed and to form a cavity there between, the inside diameter surfaces of the stationary magnetically permeable pole piece elements comprising a plurality of spaced magnetic pole piece elements each of which acts as a separate path for magnetic flux there being ferrofluid magnetically captured between the inside diameter of each circular pole piece said ferrofluid breaching the small gap between the inside diameter of said circular pole piece and the concentrically mounted rotating magnetic shaft, there being a plurality of ferrofluid stages, sufficient to withstand needed pressure differentials.

12 Claims, 1 Drawing Figure

LIQUID COOLED FERROFLUID-TYPE ROTATING SEALS

CROSS-REFERENCE TO RELATED APPLICATIONS

This is a continuation of U.S. patent application Ser. No. 699,428, filed Feb. 7, 1985 and now U.S. Pat. No. 4,592,557.

TECHNICAL FIELD

The present invention relates to rotary seals suitable for maintaining pressure differentials across such seals and particularly concerns means for the efficient cooling of such seals.

BACKGROUND OF THE INVENTION

The performance and life of ferrofluid seals is strongly influenced by the operating temperature of the ferrofluid.

"A temperature gradient is produced across the ferrofluid O-ring seal, as a result of the heat generated by the viscous shearing of the ferrofluid between the rotating spindle shaft and the inner diameter of the stationary pole pieces. The life of a ferrofluid rotary-seal apparatus may be extended through the proper selection of the seal housing material and housing geometry, so as to conduct heat away from the ferrofluid in one or more of the gaps of the seal. The rapid removal of heat from the ferrofluid permits a lower ferrofluid temperature during shaft operation, resulting in reduced ferrofluid loss and an extention of seal life. conducted away through the pole pieces and the spindle shaft. Thus, the operating ferrofluid temperature depends on the heat-sink capabilities of the seal materials and structure, which, in turn, determines the ferrofluid evaporation rate and, therefore, the life of the seal."

In general, mechanisms for removing heat generated in rotating ferrofluid seals are known. Examples of such mechanisms are described in U.S. Pat. No. 4,357,021, Raj in U.S. Pat. No. 4,357,022 issued to Raj et. al., Nov. 2, 1982, U.S. Pat. No. 4,340,233 issued July 22, 1982 and U.S. Pat. No. 4,357,023 issued to Yamamura on Nov. 2, 1982 describe means whereby heat generated in rotating ferrofluid seals may be removed. The various schemes described in the above cited patents are summarized in U.S. Pat. No. 4,357,023, column 2, line 57 through column 3, line 42.

However, in order for heat to reach the heat conductive housing, it must travel through magnetic pole pieces. In general, magnetic materials have poor thermal conductivity which, when combined with a relatively long thermal path, results in a large temperature differential between the ferrofluid seal and the heat conductive housing. Since ferrofluids should generally be operated at 50° C. or less, a large temperature differential severely inhibits performance.

In this regard, the use of heat conductive extension elements disposed alongside the pole pieces have also been proposed. This approach however, is typically suitable only for one or two stage seals, i.e., external surfaces. If attempted for use in multi-stage seals, i.e., for vacuum use, the high thermal conductivity, non-magnetic metal extension elements would interrupt the magnetic circuit, thereby compromising the seals effectiveness. Also, an undesirable temperature gradient is set up in radial direction.

Liquid cooling of a ferrofluid seal has been suggested in an article by Raj titled "Testing Magnetic Fluid Seals" in the March 1979 issue of *Industrial Research/Development*. Magnetic pole pieces are shown with channels for the flow of liquid coolant. However, in such design poor thermal conductivity of magnetic materials combined with relatively long thermal paths result in large temperature differentials between ferrofluid seal and the coolant. Also, this type of design generally results in a bulky structure.

SUMMARY OF THE INVENTION

The present invention provides for a liquid cooled ferrofluid seal of relatively compact size with improved life and performance characteristics.

In accordance with one aspect of the present invention, the constant replenishment of evaporated ferrofluid is provided.

The present invention brings the liquid coolant in close proximity to each stage of the ferrofluid seal thereby substantially reducing the temperature differential between the ferrofluid seal and the liquid cooled heat exchange surface and providing for the uniform cooling of each ferrofluid stage. The construction of the magnetic circuit design also lends itself to the reliable flow of ferrofluid to both establish a seal and to the replenishment of evaporated ferrofluid with seal life.

BRIEF DESCRIPTION OF THE DRAWING

A preferred exemplary embodiment of the present invention will hereafter be described in conjunction with the appended drawing herein.

DESCRIPTION OF PREFERRED EXEMPLARY THE EMBODIMENT

Figure 1:
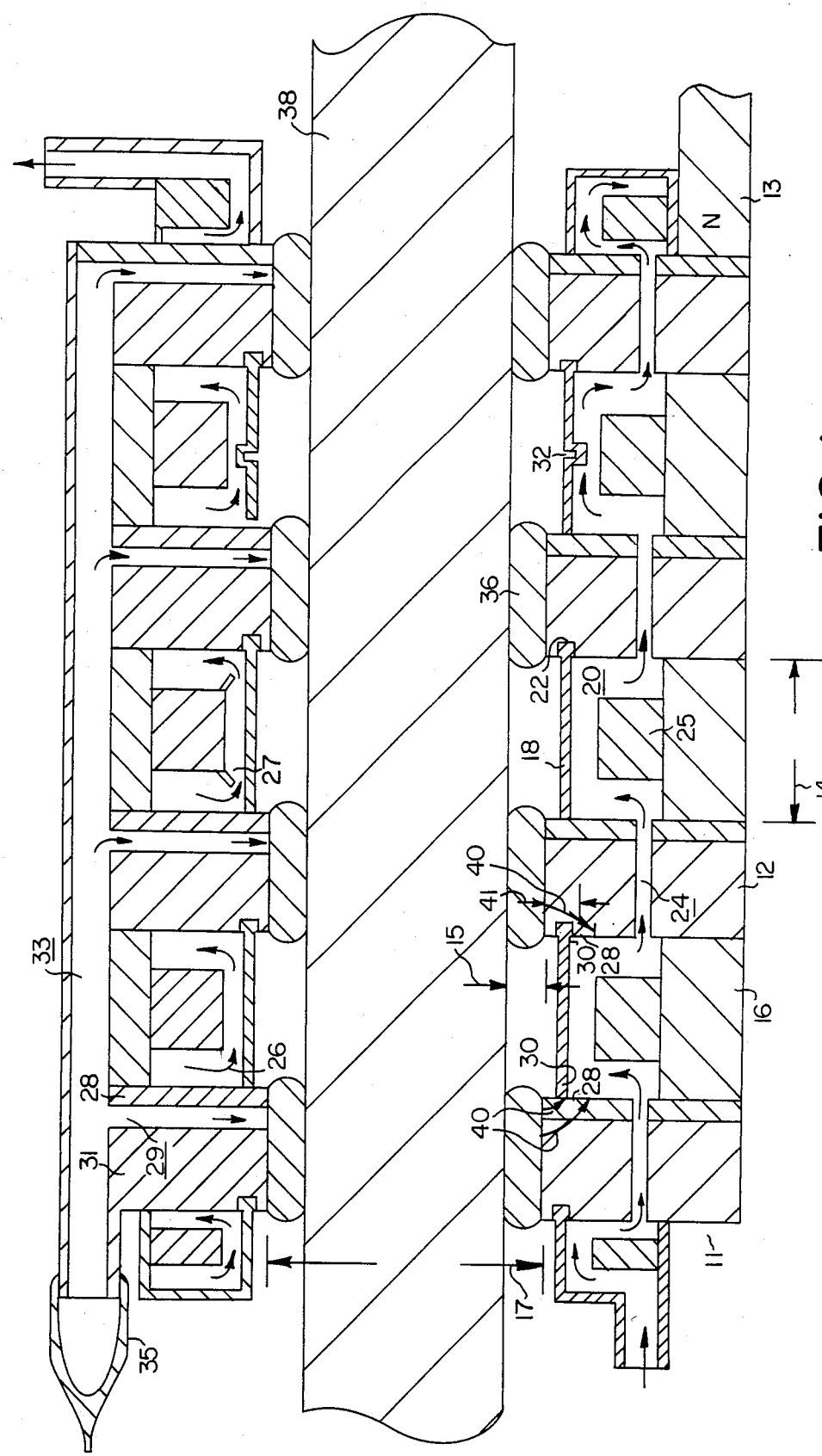
FIG. 1 is a partial cross-sectional view of a rotating ferrofluid seal illustrating liquid cooling means and, means for transferring ferrofluid into the seal region.

Referring now to FIG. 1, shown is a preferred embodiment of a liquid cooled ferrofluid seal 10 in accordance with the present invention. Magnetic pole pieces 12 are disposed in intimate magnetic contact with cylindrical magnetic spacers 16 and are thus spaced a predetermined distance, generally indicated as 14 apart. Magnet 13 supplies the required magnetic flux across ferrofluid seal gaps 15 between pole pieces 12 and rotating shaft 38. Only the North Pole of magnet 13 is shown in FIG. 1; the omitted segment of the ferrofluid seal assembly comprising the return magnetic path containing the South pole, is substantially a mirror image of the segment 11 shown in FIG. 1, differing only in that it contains more or fewer ferrofluid seal stages. Thin walled cylindrical elements 18, is of a smaller diameter than spacer 16 but of larger diameter than the inside diameter 17 of pole pieces 12, made of a high thermal conductivity, non-magnetic material such as copper, are positioned concentrically with spacer 16, to define a conduit 20. To precisely align copper cylinder 18, a shallow circular groove 22 is provided on at least one face of each pole pieces 12. Depth of groove 22 is such that pole pieces 12 and magnetic spacers 16 may be mated in intimate magnetic contact without interference from cylinder 18.

Pole pieces 12 are provided with one or more passages 24 that join adjacent conduits 20 in series. Conduits 24 may be disposed circumferentially, the amount of magnetic material removed being no greater then that required to maintain magnetic characteristics at the desired levels, i.e., below saturation. Liquid flow diverting means 25 may be provided in each in of the conduits 20 to direct the flow 26 of liquid coolant into close proximity to the regions of maximum heat flux, that is, at pole piece faces 28 and cylinder at 30 for efficient heat removal.

Pole pieces 12, magnet cylinders 16 and non-magnetic cylinders 18 are joined hermetically and preferably vacuum tight. Methods such as brazing or welding may be used. An alternative method is to coat, such as by plating, sputtering, CVD or evaporation, parts 12 and 16 with a thin layer of a metal such as silver, copper, nickel or gold and then at a temperature somewhat less than the melting point of the applied metal, and under great pressure supplied by a temperature differential expansion fixture or other means. The parts 12 and 16 are thus fused together in a vacuum tight relationship, and may be hermetically sealed to each other. At the same temperature non-magnetic cylinder 18 is circumferentially brazed to pole pieces 12 forming a hermetic seal, the brazing alloy melting at the pole piece 12 and spacer 16 fusion temperature. Because non-magnetic cylinder 18 will generally have a higher coefficient of thermal expansion than magnetic cylinder 16 it may be desirable to provide an expansion joint 32 in cylinders 18 such that during the brazing operation of cylinder 18 to pole piece 12, distortion does not occur. Shown is a circular symmetric "U" joint 32 that can readily "give" to compensate for any differential expansion between magnetic cylinder 16 and non-magnetic cylinder 18 during and after the bonding, i.e., brazing operation. The dimensions of pole pieces 12 and magnetic spacers 16 are selected to meet the requirements of the magnetic circuit with regards to field strength, saturation and leakage flux. A good choice of magnetic material would be vacuum melted iron which is characterized by high saturation magnetization and high induction. Upon completing the ferrofluid seal assembly 11 by brazing or other means, finishing machining, boring or reaming may be performed to provide the precise inside and outside diameter dimensions required.

The inside diameter 17 of pole piece 12 is smaller than the inside diameter of non-magnetic cylinder 18, the radial difference being in the range of 0.003" to 0.100". Ferrofluid seals 36 are magnetically held in close proximity to rotating shaft 38, the shaft 38 to pole piece 12 spacing 15 and other magnetic and dimensional characteristics of ferrofluid seals having been described in the previously cited Raj and Yamamura patents.

The flow of heat, generally indicated as 40, induced by rotational shear forces in ferrofluid seal 36 travel a short distance d, 41, indicated as through pole piece 12 to reach the liquid cooled surface 28 of pole piece 12 and 30 of non-magnetic cylinder 18.

Flow diverting means 25 may be shaped, for example at point 27, so as to improve liquid flow characteristics in the regions of maximum heat flux 28 for pole piece 12, 30 for non-magnetic cylinder 18.

The design principle of the present invention is best illustrated mathematically in the temperature equation $$T = To + q(d/k)$$

where T is the temperature at the ferrofluid seal, To is the temperature of the liquid cooled heat exchange surface, q is the heat flux, d is the distance from the ferrofluid seal to the liquid coolant heat exchange surfaces and, k is the thermal conductivity.

In general, magnetic metals such as are used in ferrofluid magnetic structure have low thermal conductivity, thus giving rise to large temperatures T at the ferrofluid seal. However, if the heat flux path length d can be made small, this can largely offset the poor thermal conductivity k as it is the ratio d/k that is crucial. Thus, a low temperature T may be obtained. A further benefit of liquid cooling in the proximity of the ferrofluid seal is obtained by the use of nucleate boiling of the liquid cooling by use of refrigerant liquids, such as fluorocarbons, that boil at temperatures close to ambient temperatures.

Nucleate boiling is the most efficient liquid cooling technique known. Nucleate boiling offers the additional advantage, should it be needed, of providing a constant temperature heat exchange surface, the fixed temperature being the boiling temperature of the liquids. Thus, the temperature T of the ferrofluid seal may be optimized for best operating characteristics by selecting the boiling temperature To of the liquid and designing the length d of the heat flux path such that at the specified heat flux q and thermal conductivity k desired temperature gradients are established, resulting in optimum ferrofluid seal performance and desired life.

A further benefit of the present invention lies in its ability to provide a simple and positive means whereby ferrofluid may be introduced to the ferrofluid seal region. It also provides means whereby the ferrofluid at the seal that is evaporated overtime may be readily replenished, thus maintaining seal integrity for longer periods of time.

The above is accomplished by providing pole pieces 12 with a radial conduit 29 extending down to and opening into the ferrofluid seal 36. Conduit 29 is of relatively small dimensions, such as 0.015"×0.015", such that the specified ferrofluid flow is unimpeded while retaining desired magnetic properties at the ferrofluid seal, that is, that there be no substantial weakening of the magnetic field across the ferrofluid seal gap 15 at conduit 29 due to magnetic saturation. To obtain conduit 29 in pole piece 12, pole piece 12 may be fabricated from 2 parts, 31 and 28, one part being preferably thicker than the other. According to the Raj patents, pole piece 12 may range in thickness from 0.025" to 0.080". If a thickness of 0.060" is selected then part 28 may be, for example, 0.015" thick and thick part 31 is then 0.045", the surfaces of both parts being precisely ground smooth and parallel. A radial slot 29, about 0.015"×0.015", is cut in part 31. Parts 31 and 28 are then joined by brazing, welding, adhesives etc. or, as previously described, are plated with a metal such as nickel, copper, silver or gold. The plating thickness is only sufficiently thick such that under high pressure and temperature a hermetic bond is obtained between each set of parts 31 and 28. Thin part 28 covers radial slot 29 in thick part 31. In this manner, conduit 29 is formed. It should be noted that the plating thicknesses are so thin, typically a few microns, that the magnetic characteristics of the assembled pole piece 12 are not significantly affected. Use of a magnetic material such as nickel to obtain the bond further minimizes any effect on the magnetic characteristics of pole piece 12. To feed the radial ferrofluid conduits 29 in each of pole pieces 12, which are shown lined up, axial ferrofluid conduit 33 of suitable cross-section may be provided. A pressure providing mechanism, such as expanded and sealed elastomer tubing 35, may be attached to conduit 33 to insure the flow of ferrofluid down conduit 29 to establish and thereafter replenish ferrofluid seal 36.

A further advantageous embodiment of the present invention is in combination with U.S. patent application Ser. No. 536,864 filed by the present inventor, A. Iversen on Sept. 29, 1983 and herein incorporated by reference. Iversen describes a high vacuum ferrofluid rotating seal structure wherein independent vacuum pumping means are incorporated in the region of the permanent magnet intermediate between the atmospheric side and the high vacuum side whereby the vacuum chamber is protected from gas intrusion, such as by ferrofluid seal bursts, by a buffer vacuum provided by said independent vacuum pumping means. Iversen further describes the introduction of the ferrofluid into the rotating seal region after the high temperature processing of the tube. Conduits 33 and 29 of the present invention provide the means whereby said ferrofluid may be introduced to the rotating seal region after high temperature tube processing.

What is claimed is:

1. In a ferrofluid seal apparatus for a rotary shaft, said seal being of the type comprising a magnet adapted to surround said shaft and a plurality of spaced magnetically permeable pole piece elements magnetically cooperating with said magnet, each of said pole piece elements being disposed to provide a separate magnetic flux path for magnetically capturing ferrofluid in a ferrofluid seal region between a face of said pole piece element and said shaft, the improvement wherein:

said seal includes means, formed of non-magnetic material in the vicinity of said ferrofluid seal regions, for forming a conduit for liquid coolant between magnetic pole piece in close proximity to said ferrofluid seals; and said magnetic pole pieces include passages therethrough for providing fluid communication between adjacent conduits.

2. The appraratus of claim 1 wherein said magnetic pole pieces are circular and, said means for forming said coolant conduit comprises cylindrical magnetic spacers disposed between adjacent pole pieces at the outer periphery of the pole pieces; and thin walled cylindrical non-magnetic elements of smaller diameter than said cylindrical magnetic spacers, positioned concentrically with said magnetic spacers between said adjacent pole pieces thereby forming in cooperation with the sidewalls of said adjacent; and said passages comprise chamber, axial conduits through said pole pieces.

3. The apparatus of claim 2 wherein said chamber is provided with means for diverting liquid flow.

4. The apparatus of claim 2 wherein first and second magnetically permeable pole pieces, in the region of the magnet, are hermetically sealed and a vacuum pump affixed with an evacuating path provided through the permanent magnet to the region of the rotating shaft whereby a vacuum may be maintained in said region defined by the magnet and abutting magnetically permeable pole pieces.

5. The apparatus of claim 1 further including flow diverters disposed in said conduits.

6. In a ferrofluid seal apparatus for a rotary shaft, said seal being of the type comprising a magnet adapted to surround said shaft and a plurality of spaced magnetically permeable pole piece elements magnetically cooperating with said magnet, each of said pole piece elements being disposed to provide a separate magnetic flux path for magnetically capturing ferrofluid in a ferrofluid seal region between a force of said pole piece element and said shaft, the improvement wherein:

said pole pieces include a conduit communicating with said ferrofluid seal region; and
said seal includes means for controllably providing ferrofluid to said conduits.

7. The apparatus of claim 6 wherein said pole pieces comprise first and second circular segments, said first segment having a radial slot, and said second segment being hermetically bonded to said first segment, covering said slot to thereby form said conduit.

8. The apparatus of claim 7 wherein said first and second segments are joined by fusion bonding wherein a thin layer of material is deposited on said pole pieces surfaces and said assembled segments then being bonded under great pressure and high temperature, said temperature being generally less than the melting point of said applied material.

9. The apparatus of claim 6 wherein said means for providing ferrofluid comprises a common conduit joining said conduits to said ferrofluid seal region.

10. The apparatus of claim 9 wherein means for providing ferrofluid includes pressurization means for pressurizing said ferrofluid in said common conduit.

11. The apparatus of claim 6 wherein first and second magnetically permeable pole pieces, in the region of the magnet, are hermetically sealed and a vacuum pump affixed with an evacuating path provided through the magnet to the region of the rotating shaft whereby a vacuum may be maintained in said region defined by the magnet and abutting magnetically permeable pole pieces.

12. The apparatus of claim 6 wherein first and second magnetically permeable pole pieces, in the region of the magnet, are hermetically sealed and a vacuum pump affixed with an evacuating path provided through the magnet to the region of the rotating shaft whereby a vacuum may be maintained in said region defined by the magnet and abutting magnetically permeable pole piece.

* * * * *